Patented Feb. 27, 1951

2,543,473

UNITED STATES PATENT OFFICE 2,543,473

AMINO CYCLIC ACETALS

Murray Senkus, Terre Haute, Ind., assignor to Commercial Solvents Corporation, Terre Haute, Ind., a corporation of Maryland No Drawing. Application October 12, 1949, Serial No. 121,059

4 Claims. (Cl. 260—338)

My invention relates to new and useful acetals of 2,2'-bi-(2-amino-1,3-propanediol), and to the process of producing the same. More particularly it is concerned with acetals having the following general structural formula:

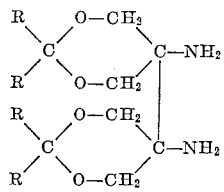

in which R may be either hydrogen, alkyl, phenyl, or phenylalkyl. As examples of such compounds there may be mentioned the following: formaldehyde 2,2'-bi-(2-amino-1,3-propanediol) diacetal, acetaldehyde 2,2'-bi-(2-amino-1,3-propanediol) diacetal, acetone 2,2'-bi-(2-amino-1,3-propanediol) diacetal, methyl ethyl ketone 2,2'-bi-(2-amino-1,3-propanediol) diacetal, benzaldehyde 2,2'-bi-(2-amino-1,3-propanediol) diacetal, acetophenone 2,2'-bi-(2-amino-1,3-propanediol) diacetal, benzophenone 2,2'-bi-(2-amino-1,3-propanediol) diacetal, and methyl benzyl ketone 2,2'-bi-(2-amino-1,3-propanediol) diacetal.

These compounds can, in general, be prepared by catalytic hydrogenation of the corresponding nitro compounds. According to this process, the desired nitro compound is subjected to hydrogenation at elevated pressures in the presence of a hydrogenation catalyst and an auxiliary solvent at temperatures between 20 and 125° C. In general, any hydrogenation catalyst which possesses catalytic activity under the conditions employed will be satisfactory. I prefer, however, to use a finely-divided Raney nickel catalyst. This catalyst is very active in hydrogenation processes of this type, and has an exceptionally long life.

The hydrogenation reaction in general can be effected at hydrogen pressures ranging from 500 to 3000 pounds per square inch. I have found it preferable, however, to carry out such reactions at pressures ranging from 750 to 1250 pounds per square inch, and at a temperature of about 40–60° C. Lower temperatures and pressures will ordinarily require a longer reaction time; and, conversely, higher pressures and temperatures will in general shorten the time for completion of the reaction.

When carrying out the reaction in accordance with the preferred conditions described above, hydrogenation is, in general, found to be complete after a period of from two to three hours. Optimum conditions in regard to the temperature, pressure, and catalyst in any given instance, however, may be readily determined by simple experiment. Since the nitro compounds used in my invention are solids, it is necessary to use an inert solvent to facilitate the hydrogenation. Many inert organic solvents may be used, but I have found that methyl alcohol and ethyl alcohol are particularly suitable.

When hydrogen is no longer absorbed and the reaction is complete, the catalyst is separated from the reaction mixture and the solvent solution is distilled to remove the solvent and ester. The products obtained in this manner are, in general, relatively pure. If it is desired to purify these materials further, however, they can be extracted with ether, the ether extract evaporated, and the residue recrystallized from water.

The acetals of 2,2'-bi-(2-nitro-1,3-propanediol) employed in preparation of these compounds, can be produced in accordance with any suitable procedure. However, I prefer to prepare such compounds in accordance with the process described in my co-pending application, U. S. Serial No. 121,058, filed October 12, 1949. By this process, hydrogen peroxide is reacted with an alkali or alkaline earth metal salt of acetals of aci-2-nitro-1,3-propanediol. I have found this reaction to be effectively carried out in aqueous solutions at room temperature over a period from one to twelve hours. Additional details of this reaction may be obtained by consulting my co-pending application cited above.

The following examples are illustrative of my invention, but are not to be construed as limiting its scope, since modifications will readily be apparent to those skilled in the art.

Example I

Acetone 2,2'-bi-(2-amino-1,3-propanediol) diacetal was prepared by hydrogenating 18 grams of acetone 2,2'-bi-(2-nitro-1,3-propanediol) diacetal at 50° C. and 1000 pounds per square inch in 500 milliliters of methanol, using 10 grams of Raney nickel as the hydrogenation catalyst. When hydrogen was no longer absorbed by the reaction mixture, the solution was filtered to remove the Raney nickel catalyst, and the filtrate was distilled to remove the methanol and water. The residue was extracted with ether, leaving about 2 grams of ether-insoluble residue. The ether extract was evaporated and 6 grams of residue was obtained which was recrystallized from 200 milliliters of water. This recrystallized product weighed 3 grams.

*Analysis.*—Calculated for $C_{12}H_{24}N_2O_4$: C, 55.36;

H, 9.29; N, 10.76; molecular weight 260.3; found: C, 55.36; H, 9.30; N, 10.73; molecular weight, 263.

*Example II*

The procedure described in Example I was followed to prepare methyl benzyl ketone 2,2'-bi-(2-amino-1,3-propanediol) diacetal from 2,2'-bi-(2-nitro-1,3-propanediol) diacetal.

*Analysis.*—Calculated for $C_{24}H_{32}N_2O_4$: C, 69.99; H, 7.84; N, 7.65; molecular weight, 412.3; found: C, 70.08; H, 7.82; N, 7.53; molecular weight 411.0.

*Example III*

Following the procedure of Example I, benzaldehyde 2,2'-bi-(2-amino-1,3-propanediol) diacetal was prepared from 2,2'-bi-(2-nitro-1,3-propanediol) diacetal.

*Analysis.*—Calculated for $C_{20}H_{24}N_2O_2$: C, 67.37; H, 6.80; N, 7.86; molecular weight, 356.2; found: C, 67.31; H, 6.87; N, 7.94; molecular weight, 357.

The amino acetals prepared as outlined above have been found to be useful as textile chemicals; and as chemical intermediates for long chain polymeric amides having value as plastics.

My invention now having been described, what I claim is:

1. As new chemical compounds, acetals of 2,2'-bi-(2-amino-1,3-propanediol) having the following structural formula:

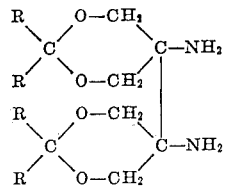

wherein R is a member selected from the group consisting of hydrogen, alkyl, phenyl, and phenylalkyl.

2. Acetone 2,2'-bi-(2-amino-1,3-propanediol) diacetal.

3. Methyl benzyl ketone 2,2'-bi-(2-amino-1,3-propanediol) diacetal.

4. Benzaldehyde 2,2'-bi-(2-amino-1,3-propanediol) diacetal.

MURRAY SENKUS.

REFERENCES CITED

The following references are of record in the file of this patent:

UNITED STATES PATENTS

| Number | Name | Date |
|---|---|---|
| 2,247,256 | Senkus | June 24, 1941 |
| 2,346,454 | Robinette | Apr. 11, 1944 |
| 2,370,586 | Senkus | Feb. 27, 1945 |
| 2,413,250 | Senkus | Dec. 24, 1946 |